(12) United States Patent
Montambault et al.

(10) Patent No.: US 12,418,190 B2
(45) Date of Patent: Sep. 16, 2025

(54) SYSTEM FOR CYCLING BATTERY CELLS WITH PRESSURE REGULATION

(71) Applicant: HYDRO-QUÉBEC, Montréal (CA)

(72) Inventors: Serge Montambault, Saint-Marc-sur-Richelieu (CA); François Morin, Carignan (CA); Étienne Rivard, Boucherville (CA); Christian Perreault, Saint-Bruno-de-Montarville (CA); Karim Zaghib, Longueuil (CA)

(73) Assignee: HYDRO-QUÉBEC, Montreal (CA)

( * ) Notice: Subject to any disclaimer, the term of this patent is extended or adjusted under 35 U.S.C. 154(b) by 551 days.

(21) Appl. No.: 17/998,579

(22) PCT Filed: May 7, 2021

(86) PCT No.: PCT/CA2021/050642
§ 371 (c)(1),
(2) Date: Nov. 11, 2022

(87) PCT Pub. No.: WO2021/226705
PCT Pub. Date: Nov. 18, 2021

(65) Prior Publication Data
US 2023/0216322 A1    Jul. 6, 2023

(30) Foreign Application Priority Data
May 13, 2020   (CA) ............................. CA 3080727

(51) Int. Cl.
*H02J 7/00*        (2006.01)
(52) U.S. Cl.
CPC .......... *H02J 7/0069* (2020.01); *H02J 7/0013* (2013.01); *H02J 7/0047* (2013.01)

(58) Field of Classification Search
CPC .................................................. H01M 10/486
See application file for complete search history.

(56) References Cited

U.S. PATENT DOCUMENTS

| 4,209,479 A | 6/1980 | Gunther et al. |
| 7,264,901 B2 | 9/2007 | Gow et al. |
| (Continued) | | |

FOREIGN PATENT DOCUMENTS

| CA | 2306482 | 2/1999 | |
| CN | 107732310 A * | 2/2018 | ........ H01M 10/0404 |
| (Continued) | | | |

OTHER PUBLICATIONS

International Search Report and Written Opinion for international application No. PCT/CA2021/050642, mailed on Aug. 25, 2021.

*Primary Examiner* — Daniel Kessie
(74) *Attorney, Agent, or Firm* — Womble Bond Dickinson (US) LLP

(57) ABSTRACT

A system for cycling battery cells with pressure regulation is disclosed. The system comprises supports for receiving the battery cells which insert in a clamping arrangement having jaws moving one with respect to the other by an actuator operated by a controller in order to apply a pressure in a pressure application axis to the cells. A pressure sensor measures the pressure applied to the cells while a cycling module connected to the cells performs their cycling and measures their charge and discharge level. A programmable processing unit ensures a control of the pressure and, if desired, the temperature applied to the cells according to a programmed cycling mode and records data representative of the pressure and other cycling measurements.

19 Claims, 11 Drawing Sheets

(56) References Cited

U.S. PATENT DOCUMENTS

| | | | |
|---|---|---|---|
| 7,591,303 B2 * | 9/2009 | Zeigler | B60H 1/00378 |
| | | | 62/323.3 |
| 8,440,339 B2 | 5/2013 | Harada et al. | |
| 8,507,125 B2 | 8/2013 | Meschter | |
| 9,306,252 B2 | 4/2016 | Kristofek et al. | |
| 9,634,358 B2 | 4/2017 | Matsushita | |
| 2009/0087727 A1 * | 4/2009 | Harada | H01M 10/613 |
| | | | 429/120 |
| 2009/0123819 A1 * | 5/2009 | Kim | F28D 15/0275 |
| | | | 429/120 |
| 2010/0276132 A1 * | 11/2010 | Payne | F28D 15/0266 |
| | | | 165/169 |
| 2010/0304203 A1 * | 12/2010 | Buck | H01M 10/647 |
| | | | 29/730 |
| 2011/0027631 A1 * | 2/2011 | Koenigsmann | H01M 10/6567 |
| | | | 429/62 |
| 2011/0052959 A1 * | 3/2011 | Koetting | H01M 10/6555 |
| | | | 429/120 |
| 2011/0293982 A1 * | 12/2011 | Martz | H01M 10/6557 |
| | | | 429/120 |
| 2012/0244393 A1 | 9/2012 | Stanek et al. | |
| 2013/0255293 A1 * | 10/2013 | Gadawski | H01M 10/6555 |
| | | | 429/62 |
| 2013/0280575 A1 | 10/2013 | Obrist et al. | |
| 2013/0330577 A1 | 12/2013 | Kristofek et al. | |
| 2014/0147709 A1 * | 5/2014 | Ketkar | F25B 1/00 |
| | | | 429/50 |
| 2015/0134172 A1 | 5/2015 | Ose | |
| 2015/0303527 A1 | 10/2015 | Maxwell | |
| 2016/0181674 A1 | 6/2016 | Kristofek et al. | |
| 2016/0285144 A1 | 9/2016 | Song et al. | |
| 2017/0125860 A1 | 5/2017 | Chatroux et al. | |
| 2018/0191023 A1 | 7/2018 | Cao | |
| 2019/0245170 A1 | 8/2019 | Brinkmann et al. | |
| 2023/0049302 A1 * | 2/2023 | Kim | H01M 10/04 |

FOREIGN PATENT DOCUMENTS

| | | | |
|---|---|---|---|
| CN | 107256934 | 11/2019 | |
| DE | 102013213909 | 1/2015 | |
| EP | 2924797 | 5/2017 | |
| JP | 2010040345 | 2/2010 | |
| JP | 5266634 | 8/2013 | |
| JP | 2014010983 | 1/2014 | |
| JP | 2020119823 | 8/2020 | |
| WO | 2014178236 | 11/2014 | |
| WO | 2019123903 | 6/2019 | |
| WO | WO-2020239927 A1 * | 12/2020 | H02J 7/0069 |

\* cited by examiner

SYSTEM FOR CYCLING BATTERY CELLS WITH PRESSURE REGULATION

CROSS REFERENCE TO RELATED APPLICATIONS

This application is a U.S. National Phase Under 35 U.S.C. 0 of International Application No. PCT/CA2021/050642, titled "SYSTEM FOR CYCLING BATTERY CELLS WITH PRESSURE REGULATION," filed May 7, 2021, which is a PCT application claiming priority to and the benefit of Canadian Application No. 3,080,727, titled "SYSTEM FOR CYCLING BATTERY CELLS WITH PRESSURE REGULATION," filed May 13, 2020, which are incorporated herein in their entirety by reference.

FIELD OF THE INVENTION

The invention generally relates to equipment for cycling battery cells, and more particularly to a system for cycling battery cells with pressure regulation.

BACKGROUND

New batteries are constantly being developed, in particular to increase the range of an electric vehicle. In addition to batteries with a liquid electrolyte such as lithium-ion, searches also focus on solid-state batteries as well as hybrid-type batteries (liquid and solid electrolyte). Solid-state batteries are increasingly considered to advantageously replace the liquid electrolyte batteries and form the next generations of batteries, especially in the electric vehicle industry and residential and industrial energy storage. The teams working on battery chemistry need systems for cycling cells which they develop to arrive at an efficient product. Among other things, the chemistry and the architecture of solid-state battery cells involve that they are subjected to a precise pressure to get optimum performance of the battery. It is thus important to determine the pressure value to be applied to the cells to obtain optimum performance. In the case of a solid-state battery, the optimum pressure may be significant, for example several hundreds of PSI and even over 4000 PSI, even if a minimum pressure is desired.

The current systems for cycling under pressure are inappropriate for determining the parameters optimizing the performance of a battery, depending on the cell chemistry used. Although the current systems may regulate the temperature using a device with a heat-transfer liquid, they only allow a moderate pressure application on the cells, generally of some PSI and not exceeding about 100 PSI. The current systems thus do not allow applying significant levels of pressure as required for solid-state batteries, do not allow applying a programmable variable pressure, and do not allow controlling the pressure application function. Also, the current systems are complex to adjust, heavy, or have little flexibility. Furthermore, the current systems have temperature regulation circuits configured to maintain the test temperature of a battery at a fixed value, for example 27° C. (80° F.) for a Li-ion type battery, whereas a variable temperature could be preferable depending on the chemistry of the battery.

SUMMARY

According to an embodiment of the invention, there is provided a system for cycling battery cells, the system comprising:

at least one support defining a housing for receiving one of the battery cells;
a clamping arrangement having (i) lower and upper jaws between which said at least one support housing one of the battery cells is insertable, the jaws being mobile with respect to each other in a pressure application axis, and (ii) pressure application surfaces for applying pressure to the cell housed in each support, one of the pressure application surfaces being intended to exert a pressure on an active zone of the cell when the jaws are in pressure application position;
an actuator operatively coupled to the clamp arrangement in order to control a clamping of the jaws according to a control signal;
a pressure sensor operatively associated to the cell in order to produce a signal indicative of a pressure exerted by the jaws on the cell;
a cycling module for cycling the cell, the cycling module having an interface connectable to the cell for charging and discharging the cell according to a programmed cycling mode and measuring a level of charge and discharge of the cell;
a control module for controlling the actuator, producing the control signal controlling the clamping of the jaws according to a pressure setting signal; and
a processing unit connecting to the cycling module, to the control module of the actuator and to the pressure sensor, the processing unit being configured to program the cycling mode of the cell and transmit the cycling mode to the cycling module, to program a pressure to be applied to the cell and generate the pressure setting signal according to a pressure measured by the pressure sensor in order to form a feedback loop of the pressure applied to the cell, and to record data representative of the pressure applied to the cell and of the level of charge and discharge of the cell.

Preferably, the system according to the invention may be used as a tool for determining one or several precise values of pressures to be applied to battery cells, as well as other possible parameters influencing their behaviors and operations such as one or more precise temperatures, to obtain optimum performance of the cells according to their chemistries and various conditions of operation and use tested by the system, including a rate of charge and discharge and a density of transited current. The system allows cycling the cells to be tested under low to high pressures and developing a real-time management algorithm implementable for example in a BMS ("Battery Management System") or a VCU ("Vehicle Control Unit") to control a pressure to be applied and a temperature to be maintained or varied for optimizing a performance of the battery as a function of various conditions of operation and use of the cells.

BRIEF DESCRIPTION OF THE DRAWINGS

A detailed description of preferred embodiments of the invention will be given hereinbelow with reference to the following drawings.

DETAILED DESCRIPTION OF THE PREFERRED EMBODIMENTS

Figure 1:
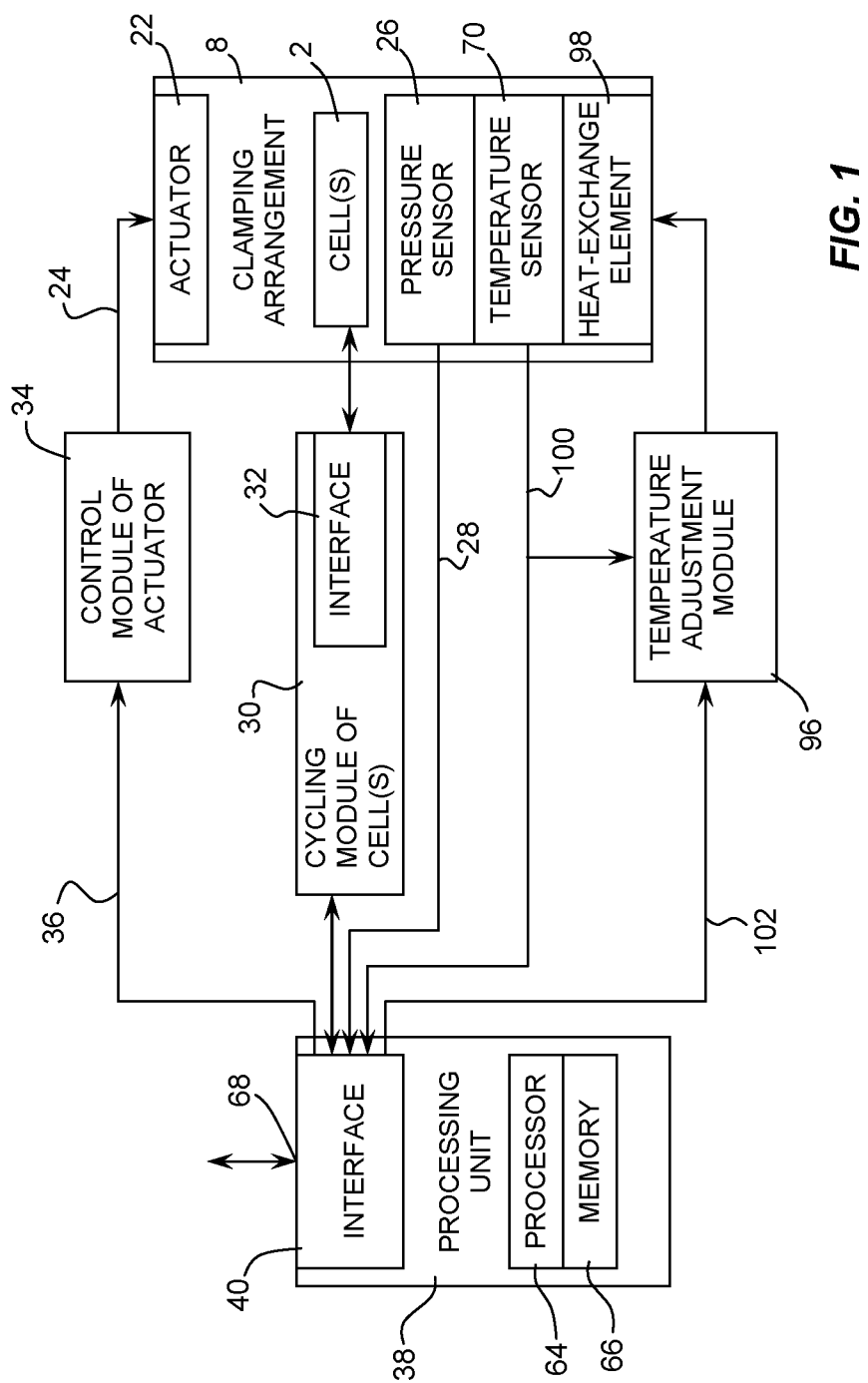
FIG. 1 is a block diagram illustrating a battery cycling system according to an embodiment of the invention.

Referring to FIG. 1, a system for cycling battery cells 2 according to an embodiment of the invention is illustrated.

Figure 9:
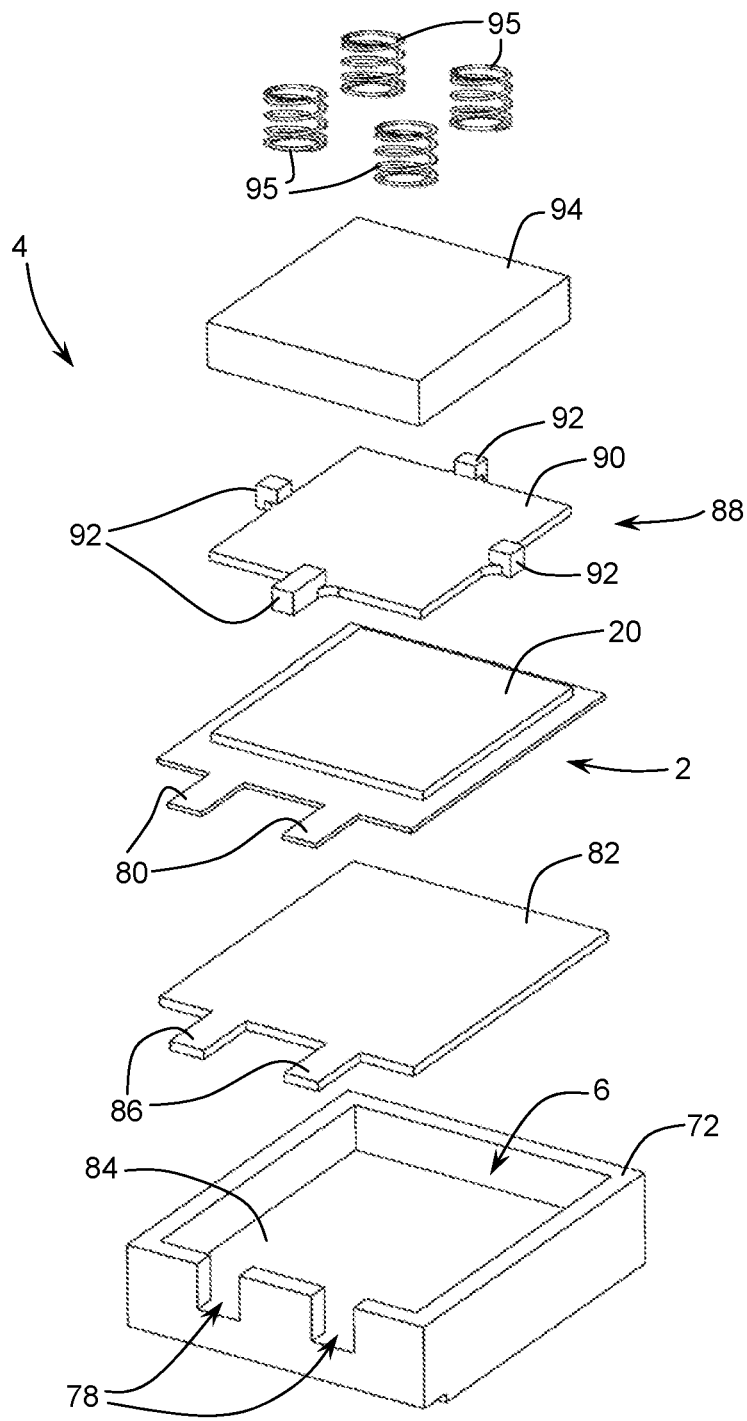
FIG. 9 is a perspective and exploded view of a cell support according to an embodiment of the invention.

Referring to FIGS. 2 to 8, the system comprises one or more supports 4 defining a housing 6 (as illustrated in FIG. 9) for receiving one of the battery cells 2. To simplify the following description, reference will generally be made to several supports 4 and several cells 2 but it should be understood that there may be only one support 4 and only one cell 2 as in the arrangement illustrated without support in FIG. 6.

Figure 2:
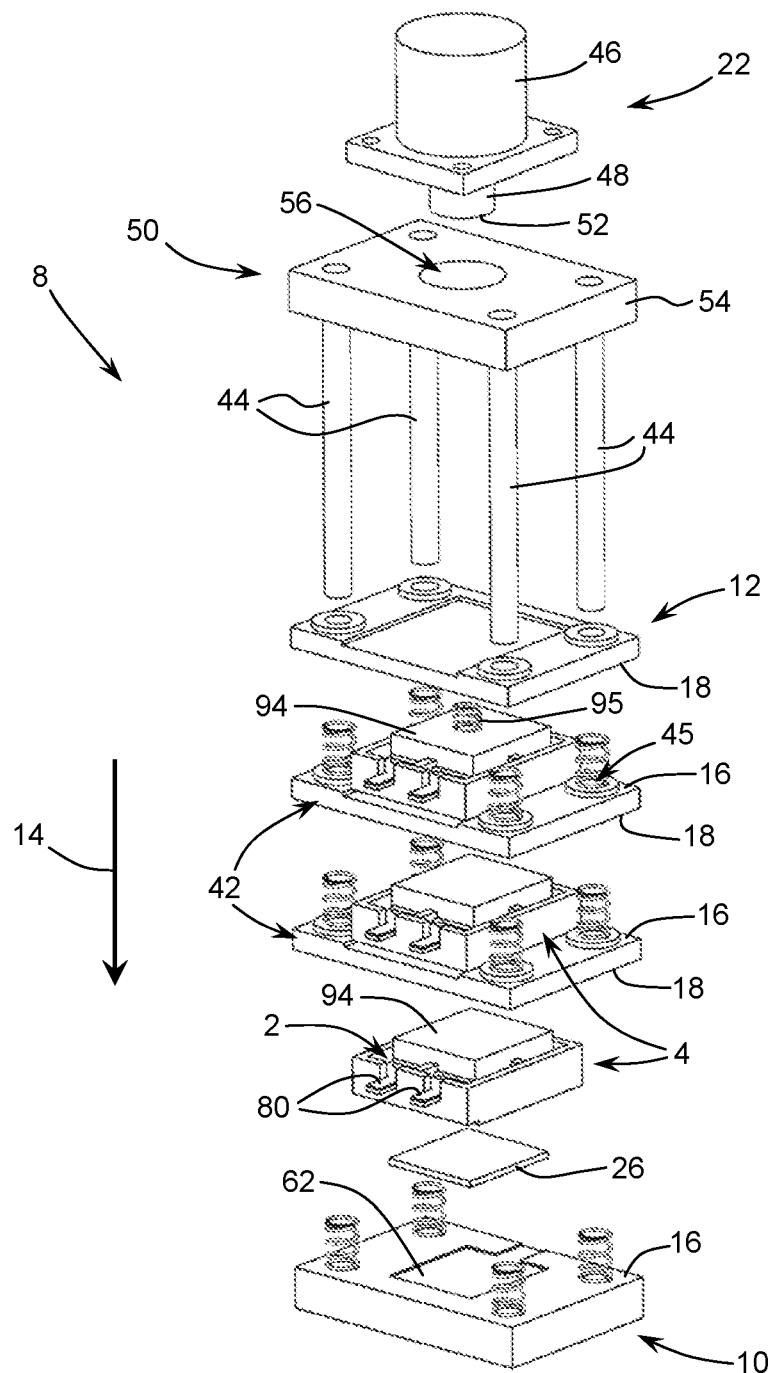
FIG. 2 is a perspective and exploded view of a pressure application device for applying pressure to the cells according to an embodiment of the invention.

Referring in particular to FIG. 2, a clamping arrangement 8 has lower and upper jaws 10, 12 between which the supports 4 housing battery cells 2 are insertable. The jaws 10, 12 are mobile with respect to each other in a pressure application axis as depicted by arrow 14. The clamping arrangement 8 also has pressure application surfaces 16, 18 for application of pressure to the cell 2 housed in each support 4. According to an embodiment, the pressure application surfaces 18 are intended to exert a pressure on active zones 20 (e.g. anode-cathode-electrolyte complex, as illustrated in FIG. 9) of the cells 2 when the jaws 10, 12 are in pressure application position. A reverse embodiment where the surfaces 16 are intended to exert the pressure on the active zones 20 is also possible. The pressure application surfaces 16, 18 may be formed by surfaces of the jaws 10, 12 and surfaces of pressure transmission plates 42 extending between two supports 4, each pressure transmission plate 42 being freely mobile in the pressure application axis 14.

An actuator 22 is operatively coupled to the clamping arrangement 8 so as to control a clamping of the jaws 10, 12 according to a control signal 24 (as illustrated in FIG. 1).

A pressure sensor 26 is operatively associated to the cells 2 in order to produce a signal 28 (as illustrated in FIG. 1) indicative of a pressure exerted by the jaws 10, 12 on the cells 2.

Referring back to FIG. 1, the system according to the invention comprises a cycling module 30 for cycling the cells 2, also called battery cycler. The cycling module 30 has an interface 32 connectable to the cells 2 for charging and discharging the cells 2 according to a programmed test cycling mode or cycling protocol and for measuring levels of charge and discharge of the cells 2, for example by voltage and current measurements relative to the cells 2. In charging mode, the cycling module 30 injects a current having an intensity depending on a desired charging speed. This intensity may be qualified in C. A value of 1C means that a cell 2 will be charged in 1 hour, a value of 2C means that the cell 2 will be charged in 30 minutes, a value of C/2 means that the cell 2 will be charged in 2 hours, etc. Likewise, in discharging mode, the cycling module 30 consumes the energy stored in a cell 2 and extracts a current therefrom having an intensity depending on a desired discharging speed which may also be measured in C. A control module 34 for controlling the actuator 22, also called motor controller, produces the control signal 24 that controls the clamping of the jaws 10, 12 (illustrated e.g. in FIG. 2) according to a pressure setting signal 36. A processing unit 38 connects to the cycling module 30, to the control module 34 of the actuator 22 and to the pressure sensor 26. The processing unit 38 is configured to program the cycling mode of the cells 2 and transmit it to the cycling module 30, to program a pressure to be applied to the cells 2, for example as a function of a level or a rate of charge and discharge or as a function of a number of cycles imposed to the cells 2, and to generate the pressure setting signal 36 according to a pressure measured by the pressure sensor 26 so as to form a feedback loop of the pressure applied to the cells 2, and to record data representative of the pressure applied to the cells 2 and the levels of charge and discharge of the cells 2. The processing unit 38 has an interface 40 for communicating with the different components of the system and with the outside, in order for example to set parameters of the functions of the cycling system and transmit the data recorded by the processing unit 38. The processing unit 38 allows modulating the pressure applied to the cells 2 as a function, for example, of two parameters managed by the cycling module 30, namely the level of charge/discharge of the cells 2, measured and evaluated by the cycling module 30 as a function of the voltage level of the cells 2, and the charging rate, measured and evaluated by the cycling module 30 as a function of the intensity of current transited between the cycling module 30 and the cells 2. As a function of the established test protocol, a feedback on the level of charge/discharge and the rate of charge/discharge is transmitted to the processing unit 38 which coordinates pressure value variation instructions transmitted via the control module 34 of the actuator 22 to adjust the value of pressure applied by the actuator 22 and the clamping arrangement 8.

Figure 11A:
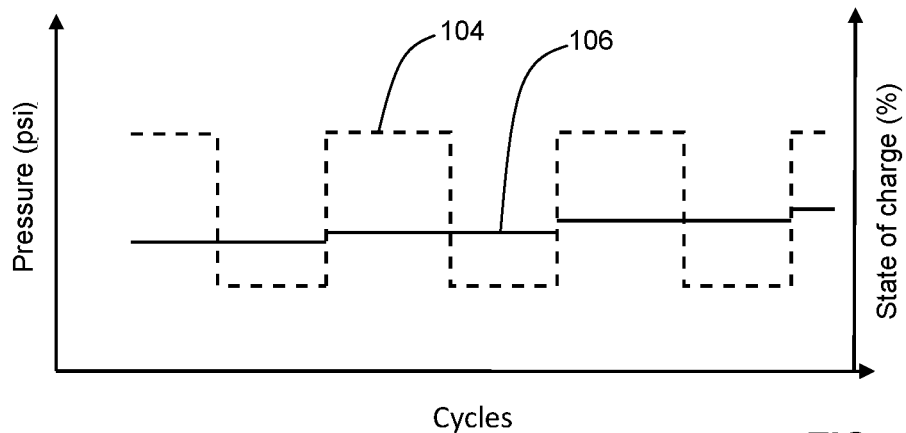
FIGS. 11A, 11B and 11C respectively illustrate examples of cycling protocols of a battery cell according to an embodiment of the invention.

Referring to FIG. 11A, an example of a pressure value instruction forming the control signal 24 transmitted by the control module 34 to the actuator 22 is illustrated, as a function of the number of cycles reached by a cell 2 and the value of its charge/discharge level. According to a possible test protocol 104, a high and constant pressure is applied during a charging period of the cell 2, while a lower and constant pressure is applied during a discharging period of the cell 2. According to another possible test protocol 106, a same constant pressure is applied during the charging and discharging phases of a cell 2 for a same cycle, and then the pressure value is slightly increased from cycle to cycle, as a function for example of an expected decrease of the useful life of the cell 2. Other test protocols are of course possible.

Figure 11B:
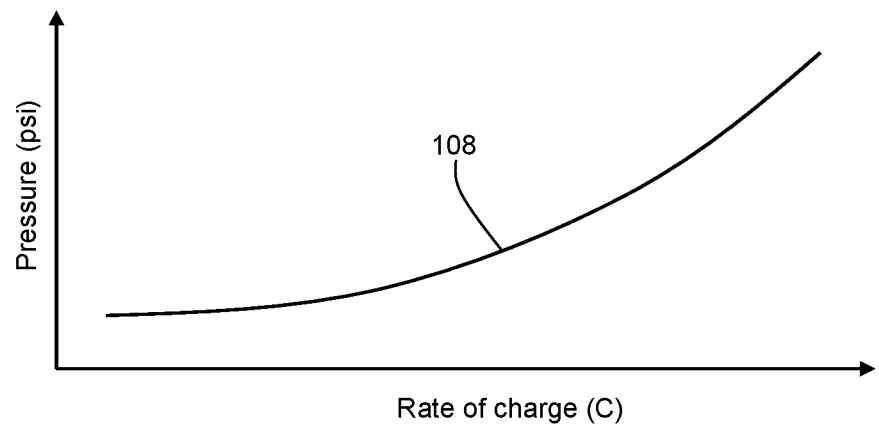

Referring to FIG. 11B, the processing unit 38 may coordinate the instructions related to a test protocol 108 between the control module 34 of the actuator 22 and the cycling module 30 so as to increase the mean value of the pressure applied to a cell 2 as a function of the increase of the value of the charge/discharge rate measured by the intensity of the current transited between the cycling module 30 and the cell 2. By modulating the pressure, the performance of the cell 2 can thus be maximized under greater response conditions, such as current demands involving discharge rates of several C. This pressure modulation may also be used in order to prevent a premature deterioration of the cell 2 during extraordinary operating conditions.

Figure 11C:
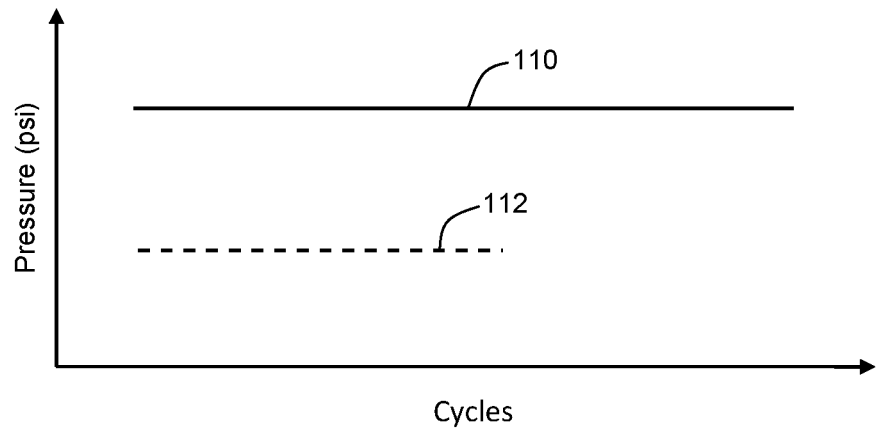

Referring to FIG. 11C, one of the effects of the application of the pressure on the performance of the battery that the cycling system according to the invention allows evaluating is illustrated. For instance, a test protocol 110 allows achieving a higher number of cycles of charge and discharge of a cell 2 with respect to a test protocol 112 where a lower value of pressure is applied to the cell 2, thus reducing more quickly the useful life of the cell 2. Other effects on the performance of the cell 2 may be observed by varying the values of pressure and, if desired, of temperature during charging and discharging, such as an intensity of admissible charge/discharge current without damaging the cell 2, a maintenance of the capacity of the cell 2 during cycling, performance of the cell 2 at low temperature, a contained propagation of dendrites, etc.

Referring back to FIG. 2, according to an embodiment, the clamping arrangement 8 comprises a set of guiding rods 44 extending between the jaws 10, 12 in the pressure application axis 14. The guiding rods 44 pass through corresponding openings 45 in each pressure transmission plate 42 so that each pressure transmission plate 42 is mobile only in the pressure application axis 14.

According to an embodiment, the upper jaw 12 is formed by a pressure transmission plate freely mobile in the pressure application axis 14, such as the pressure transmission plates 42. The actuator 22 comprises a motor unit 46, a piston 48 coupled to and moveable by the motor unit 46 in the pressure application axis 14 according to the control signal 24 (illustrated in FIG. 1) transmitted to the motor unit 46. The actuator 22 may be of a linear type, and be embodied by a hydraulic or pneumatic jack or, preferably, by an electric jack possibly more precise, more compact, easier to control and having a faster response time. The actuator 22 also comprises a support structure 50 for supporting the motor unit 46 at a fixed distance from the lower jaw 10. The piston 48 has an end 52 pressing against the transmission plate forming the upper jaw 12 when the jaws 10, 12 are in the pressure application position. The support structure 50 may take the form of a plate 54 connected to the lower jaw 10 by the guiding rods 44. The motor unit 46 is mounted on the plate 54. The plate 54 has a central hole 56 through which the piston 48 passes to apply a pressure against the transmission plate forming the upper jaw 12.

Figure 4:
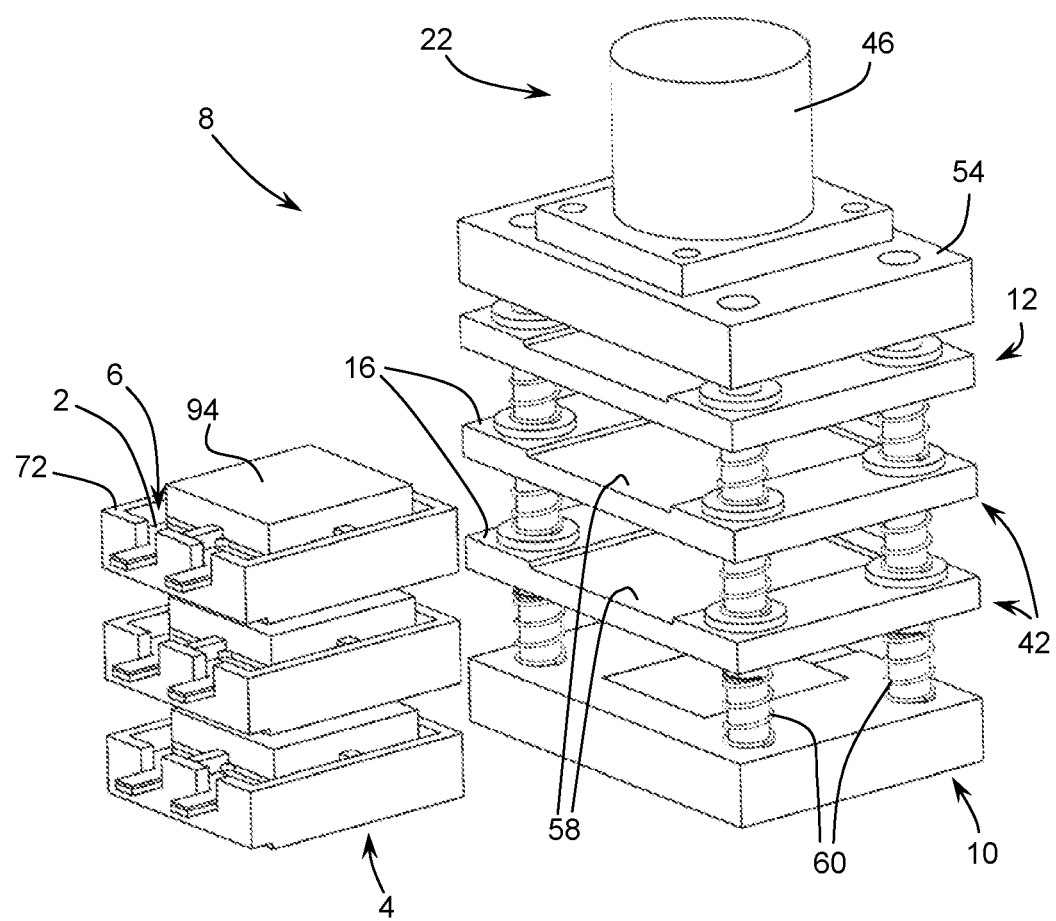
FIG. 4 is a perspective view from another angle of the device and the cell supports illustrated in FIG. 3.
Figure 5:
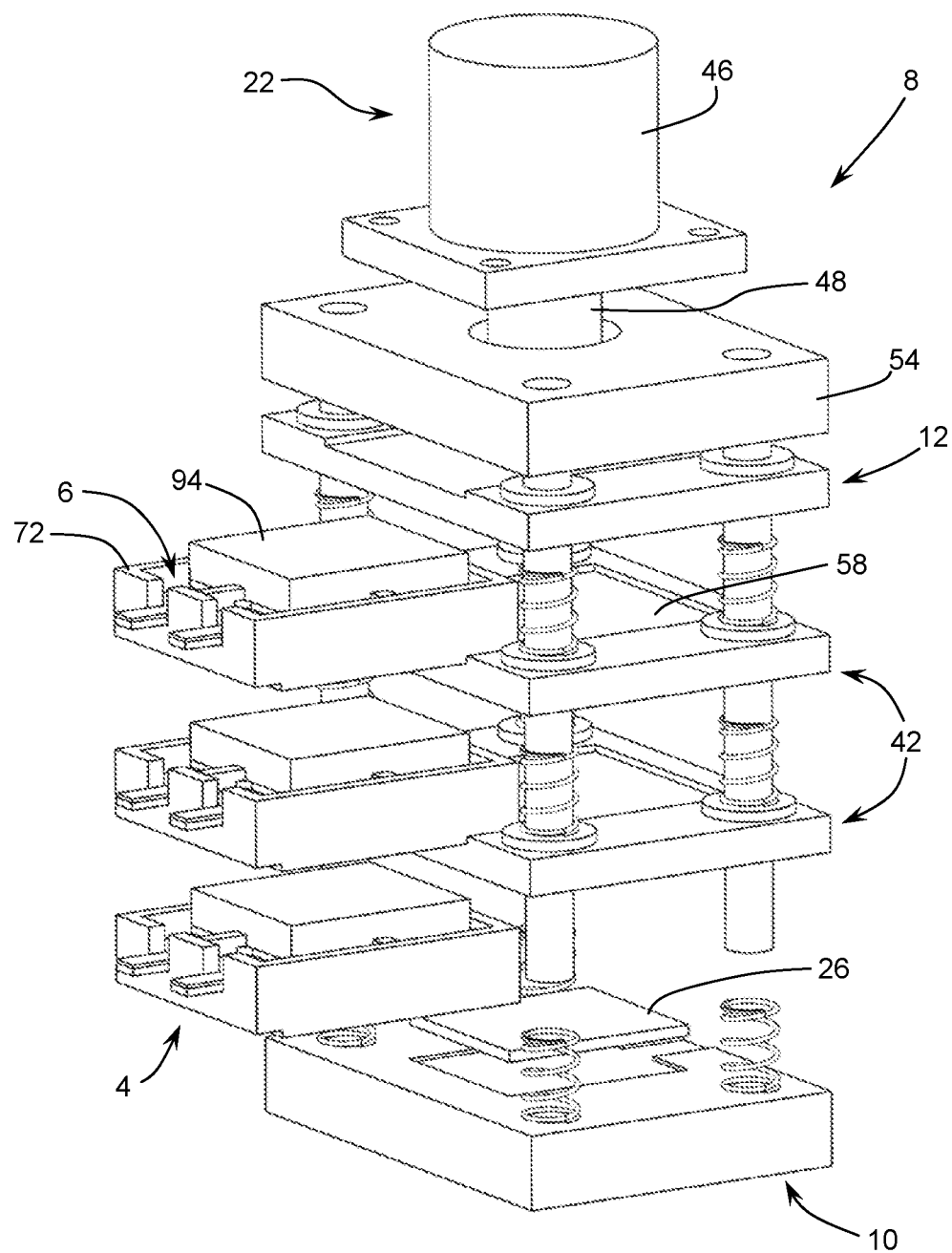
FIG. 5 is a perspective and partially exploded view of a pressure application device with cell supports during their insertion in the device, according to an embodiment of the invention.
Figure 6:
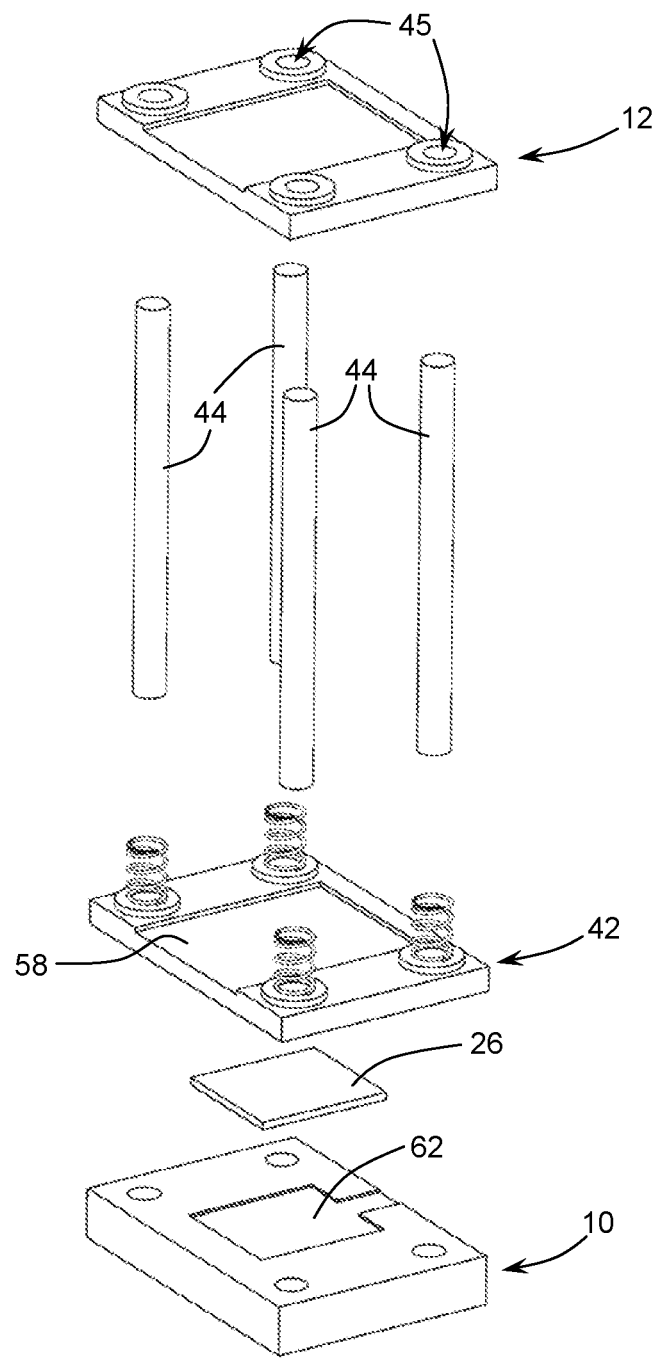
FIG. 6 is a perspective and exploded view of a part of a pressure application device according to an embodiment of the invention.
Figure 7:
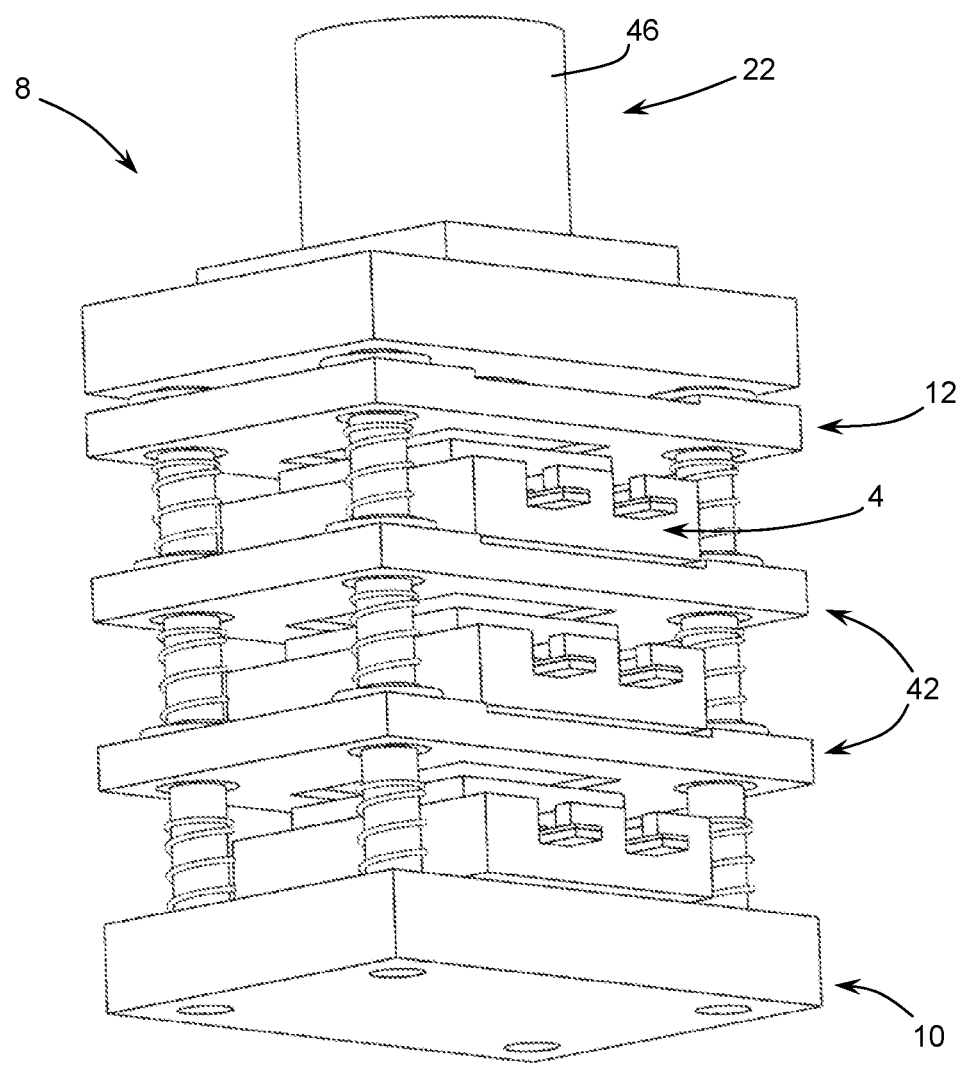
FIG. 7 is a perspective view of a pressure application device in which cell supports are inserted, according to an embodiment of the invention.
Figure 8:
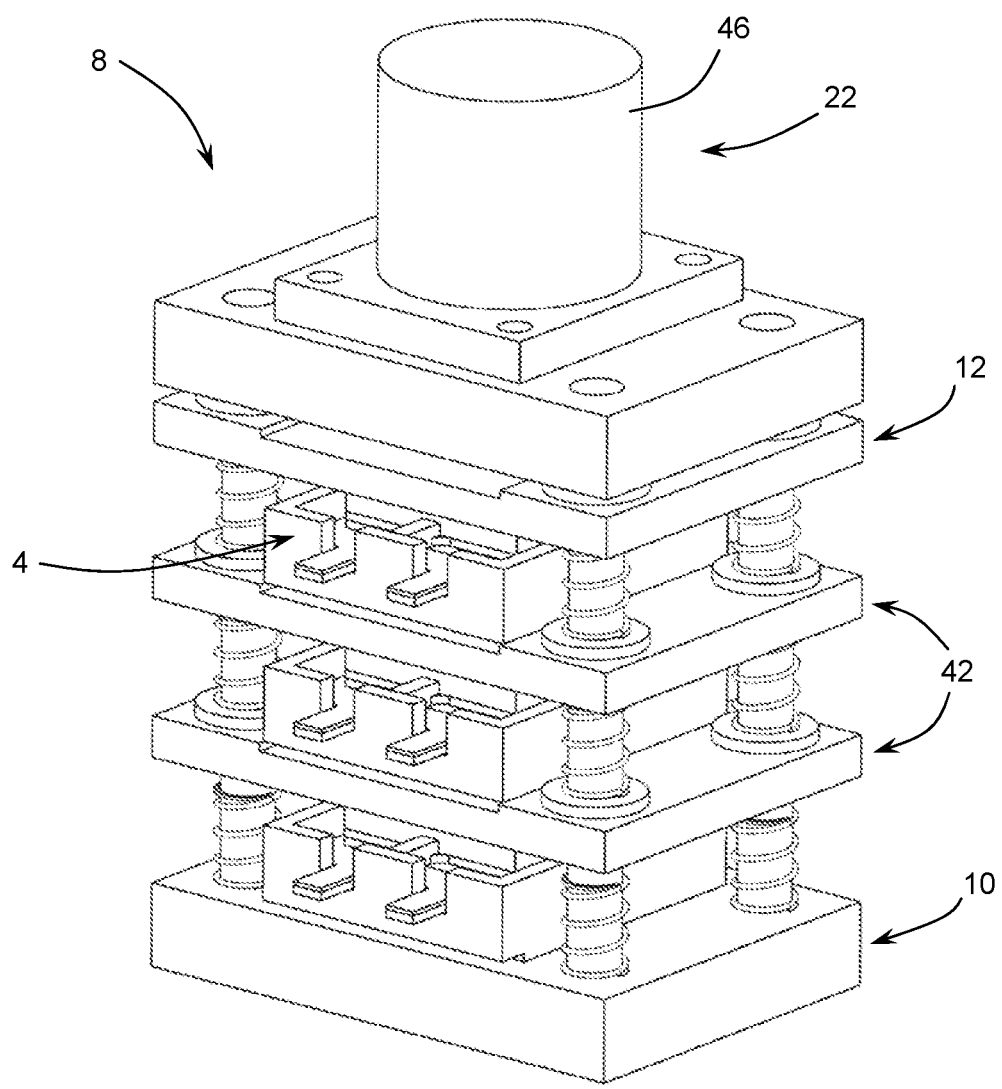
FIG. 8 is a perspective view for another angle of the pressure application device illustrated in FIG. 7.

Referring to FIG. 4, according to an embodiment, each pressure transmission plate 42 has an upper surface 16 defining a positioning cavity 58 in which a lower part of a support 4 is engageable.

According to an embodiment, the clamping arrangement 8 comprises springs 60 extending between the jaws 10, 12 and each pressure transmission plate 42 so that the jaws 10, 12 and the pressure transmission plates 42 are moved away from one another by a distance of at least a height of one support 4 housing a cell 2 when the jaws 10, 12 are in release position, thereby facilitating the insertion of the supports 4 in the clamping arrangement 8.

Referring again to FIG. 2, according to an embodiment, the lower jaw 10 has an upper surface 16 defining a cavity 62 having a shape adapted to receive the pressure sensor 26 so that the pressure sensor 26 measures a pressure applied by the jaws 10, 12 to the cells 2 in the supports 4. The lower jaw 10 may advantageously serve as or form a base for the clamping arrangement 8.

According to an embodiment, the pressure application surfaces 16, 18 are generally flat and extend perpendicular to the pressure application axis 14.

Referring back to FIG. 1, the processing unit 38 may comprise a processor 64 coupled to a memory 66 which stores instructions executable by the processor 64 and operating parameters of the cycling system received in input 68 through for example the input/output interface 40. The operating parameters may comprise a test protocol used by the instructions executed by the processor 64 and defining the pressure to be applied. In the case where a thermal regulation or control is considered, the instructions may define a temperature value of the cells 2 to be reached as a function for example of a level and a rate of charge and discharge derived from the instructions and measurements associated to the cycling module 30 of the cells 2 in communication with the processing unit 38. The test protocol may define a series of pressures to be applied and maintained during a time period, for example from 0 PSI to 4000 PSI or even more if desired. The pressure setting signal 36 transmitted to the control module 34 of the actuator 22 may be regulated by the processing unit 38 in compensation to a variation of volume of the cells 2 during an execution of the cycling mode. A thickness, distance or position sensor (not shown) of the cells 2 may be operatively associated to the cells 2 so as to produce a signal indicative of their thickness or a variation of their thickness during the cycling. The signal may be transmitted to the processing unit 38 which may record data representative of the thicknesses measured by the thickness sensor. The measured thicknesses may be used for the regulation of pressure in the feedback loop, such that for example the pressure applied to the cells 2 is maintained fixed even in presence of a variation of temperature or volume of the cells 2. The instructions executed by the processor 64 may comprise instructions for dynamically varying the series of pressures to be applied and maintained as a function of cycles of charging and discharging of the cells 2, power demands, a number of cycles achieved, etc. The instructions may include a regulation control algorithm of the actuator 22 via the control module 34 and according to a feedback of the pressure measured by the pressure sensor 26. The pressure to be applied may also depend on a pressure of oil or like fluid in the case where the actuator 22 is a hydraulic or pneumatic jack, or a current in the case where the motor unit 46 is electric.

A temperature sensor 70 may be operatively associated to the cells 2 in order to produce a signal indicative of a temperature of the cells 2. The processing unit 38 connects to the temperature sensor 70 and is configured to record data representative of the temperature of the cells 2 according to the signal indicative of the temperature of the cells 2. The pressure setting signal 36 may then be adjusted according to the temperature measured by the temperature sensor 70. The system may comprise a temperature adjustment module 96 connected to the processing unit 38 via its interface 40 to act on a heat-exchange element 98 flowable around the cells 2 in the clamping arrangement 8 in order to for example maintain a uniform temperature from one cell 2 to another, as a function of a temperature signal 100 measured by the temperature sensor 70 and a temperature setpoint 102 generated by the processing unit 38. The action of the heat-exchange element 98 for dynamically controlling the temperature of the cells 2 may take the form of an aeration of the environment of the supports 4 (illustrated e.g. in FIG. 2)

for example by disposing the clamping arrangement 8 or a part thereof containing the cells 2 in a heat chamber (not illustrated) allowing a cycling at different temperatures. The values of temperature to be applied during a cycling may be programmed in the processing unit 38 and controlled via the temperature adjustment module 96 during tests on a battery. The action of the heat-exchange element 98 may also be implemented via a network of pipes (not illustrated) running through the supports 4 and in which a heat-exchange liquid flows for controlling the temperature of the cells 2 in a dynamic way in relation for example with the instructions of the test protocol which may define values of pressure or temperature to be applied to the cells 2 during a time period, as a function of or regardless the cycling parameters such as a level and a rate of charge and discharge of the cells 2 and a number of cycles imposed to the cells 2. The temperature adjustment module 96 may be embodied by a device comprising a pump, tanks, servo valves, a flow meter, a pipe, and a microcontroller configured to respond to the temperature value setpoints of the test protocol and to control the elements of the device accordingly.

The programming of the test protocol may be achieved via a software stored in the memory 66 and executed by the processor 64, in order for example to display a user-friendly graphical user interface allowing entering values of pressure to be applied, of temperature, etc., which may vary through time as a function of the level of charge/discharge of a cell 2 (voltage), rates of charge/discharge (current intensity), the number of cycles experienced by the battery, the residual capacity of the battery, its variation of thickness, etc. The software may be used to transmit the setpoints to the control module 34 of the actuator 22, to the cycling module 30 of the cells 2 and to the temperature adjustment module 96. The control for reaching the setpoints is achieved via the integration of feedback coming from the pressure sensor 26, the temperature sensor 70 and the measurements performed via the cycling module 30 (voltage, current, time), by the processing unit 38 via its interface 40 which integrates it in a feedback loop to the software. The software may be the source of the combination of setpoints related to the test protocols for which certain examples are illustrated in FIGS. 11A, 11B and 11C.

Referring to FIG. 9, according to an embodiment, each support 4 comprises a pressure plate 94 extending above the active zone 20 of the cell 2 and exceeding a contour 72 of the housing 6.

Figure 3:
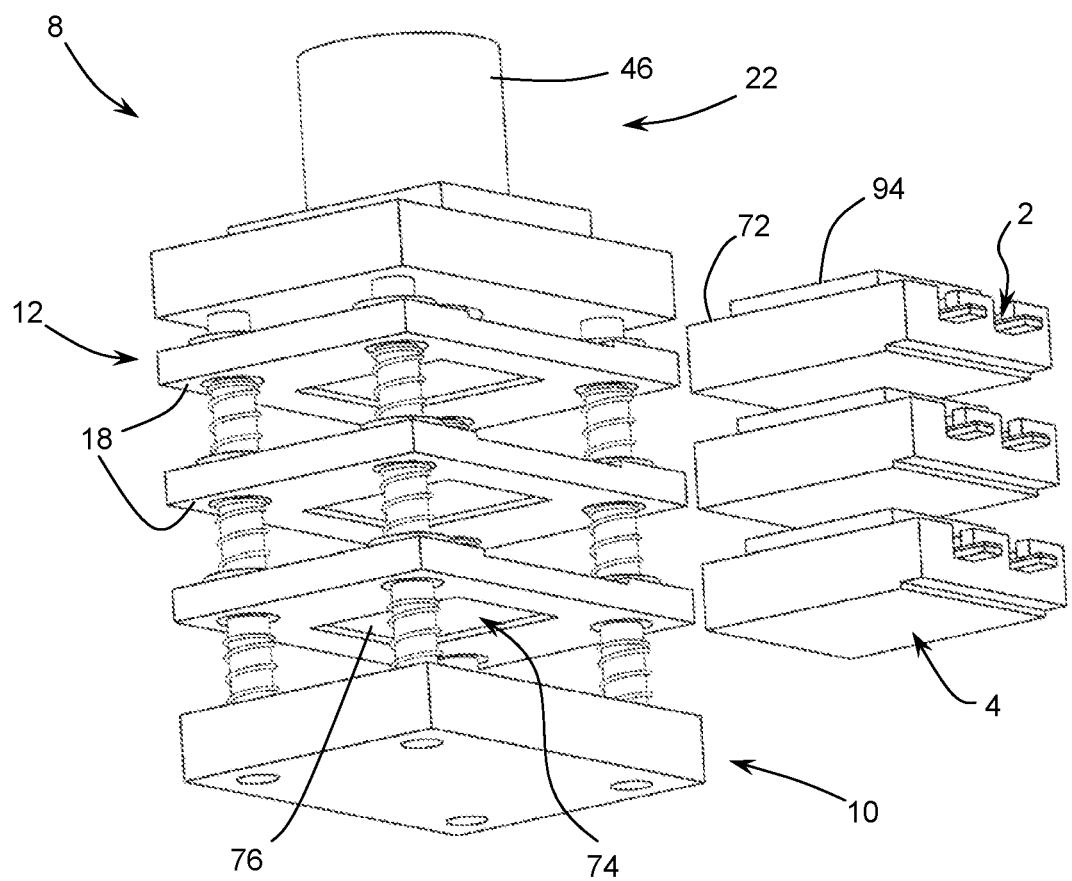
FIG. 3 is a perspective view of a pressure application device with cell supports prior to their positioning in the device, according to an embodiment of the invention.

Referring to FIG. 3, the pressure application surface 18 on the active zone 20 (illustrated e.g. in FIG. 9) defines a cavity 74 having a shape adapted to receive a portion of the pressure plate 94 exceeding the contour 72 of the housing 6 (illustrated e.g. in FIG. 9). For a pouch-type cell 2, the cavity 74 may have a generally flat bottom 76.

Figure 10:
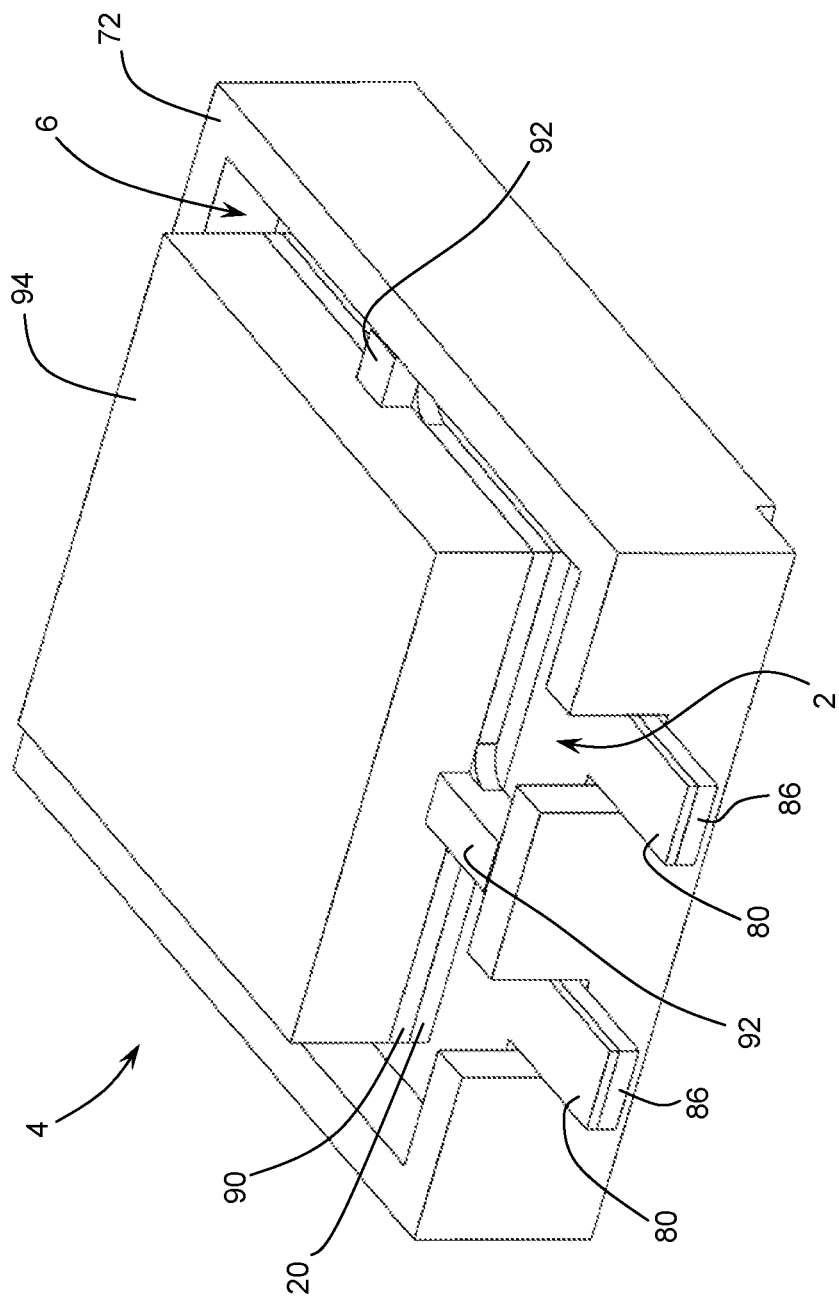
FIG. 10 is a perspective view of the cell support according to an embodiment of the invention.

Referring back to FIG. 9, the contour 72 of the housing 6 may have openings 78 through which terminals 80 of the cell 2 project for an electrical connection outside the support 4, for example with alligator clips (not illustrated). Other types of electrical connections may be used if desired. According to an embodiment, each support 4 may also comprises an insulating contact plate 82 extending against a bottom 84 of the housing 6. The contact plate 82 may have tabs 86 projecting in the openings 78 of the contour 72 of the housing 6 and forming mechanical supports for the terminals 80 of the cell 2 mounted on the contact plate 82 in the housing 6, as better illustrated in FIG. 10. The tabs 86 may also be used to electrically insulate the terminals 80 of a cell 2 with respect to another one. A spacer 88 extending above the cell 2 may be used for a precise positioning of the elements in the support 4 and to even out the pressure on the active zone 20 of the cell 2. The spacer 88 may have a central portion 90 generally flat and matching with the active zone 20 of the cell 2. The spacer 88 may be made of a flexible material such as nylon, Teflon, plastic, so as to adapt to surface defects of the cell 2. Arms 92 projecting in periphery of the central portion 90 come resting against internal faces of the contour 72 of the housing 6 so as to define a positioning of the central portion 90 on the active zone 20 of the cell 2. The pressure plate 94 extends against the central portion 90 of the spacer 88 and is in contact with the pressure application surface 18 (illustrated e.g. in FIG. 3) which applies pressure on the active zone 20 of the cell 2 of the clamping arrangement 8 when the jaws 10, 12 are in the pressure application position. A construction of the support 4 as described above ensures a uniform pressure application on all the surfaces of the cell 2, and a precise positioning of the cells 2 and the supports 4 in the clamping arrangement 8. Depending on the practiced cycling mode and the pressure applied to the cell 2, an elastic arrangement, for example an arrangement of springs 95 as in the illustrated case, introducing a mechanical elasticity in the pressure application axis may be inserted between the pressure application surface 18 (as illustrated in FIG. 2) and the pressure plate 94, or between the contact plate 82 and the bottom 84 of the housing 6, or yet between the housing 6 and the pressure application surface 18. The elastic arrangement may take another form if desired, for example an elastomeric element or a rubber disk. Such an elastic arrangement provides a play in the vertical displacement of the parts comprised between the jaws 10, 12 (illustrated in FIG. 2) when a force is applied by the actuator 22 (illustrated in FIG. 2). Such a play in the transmission chain of the force may be useful to absorb and allow a certain variation of thickness of a cell 2 during a cycling without requiring an intervention at the level of the actuator 22, and to prevent damaging the cell 2 in such a case.

Referring again to FIG. 1, the system according to the invention thus allows testing a response of a battery to a programmed cycling mode and various precise and regulated values of pressure and, if applicable, temperature applied to the cells 2 of the battery representing possible conditions of operation and use in order to determine one or more pressures to be applied to the cells 2 of the battery and other possible physical parameters such as one or more temperatures to obtain an optimum performance of the battery depending on its chemistry, its architecture and its conditions of operation and use. The system allows applying a range of various and significant pressures, for example, from 0 to 4000 PSI or more to cells 2 having for example an active zone 20 (illustrated in FIG. 9) of 50 mm×50 mm. The system, with its processing unit 38 and its other components forms a controlled and programmable assembly allowing to maintain a constant pressure and, if applicable, temperature despite a volume variation of the cells in charging and discharging phase which may represent approximately 25% of volume variation, and allowing to vary in real time and without human intervention the pressure or the temperature applied to the cells 2 as a function of a test protocol programmed in the processing unit 38. The system allows evaluating the effect of the pressure and preferably also of the temperature on the performance of the cells 2 and their resulting behavior, for different chemistries used. It allows cycling several cells 2 at the same time, at different pressure values, and at different temperature values when used in heat chambers or provided with another temperature regulation mean. The system thereby allow determining an effect of the real-time adjustment of the pressure and preferably also of the temperature on the performance of the cells 2 for different conditions of use of a battery (charge, discharge, power demand, conditions prone to a formation of dendrites, use in extreme climatic conditions, number of cycles experienced by the cells 2, etc.). Knowledge of the optimal operating parameters of the cells 2 of a battery having a particular chemistry allows coding control algorithms specific to the battery.

Referring again to FIG. 2, in order to allow a uniform distribution of the pressure, the cells 2 are disposed in the supports 4 (according to one embodiment illustrated e.g. in FIG. 9) so as to precisely position them under the piston 48 applying the force. One or several cells 2 may be tested/cycled at the same time in the system, where the supports 4 are arranged in series. Cells 2 of different thicknesses may be cycled without modification to the system. The system works for different geometries of cells 2, by adapting the dimensions of the different components. Several clamping arrangements 8 may be simultaneously used to perform tests at various pressures and at various temperatures. The system allows a quick mounting of the cells 2 to be tested.

While embodiments of the invention have been illustrated in the accompanying drawings and described above, it will be evident to those skilled in the art that modifications and additions may be brought to these embodiments without departing from the invention.

The invention claimed is:

1. A system for cycling battery cells, the system comprising:
   at least one support defining a housing for receiving one of the battery cells;
   a clamping arrangement having (i) lower and upper jaws between which said at least one support housing one of the battery cells is insertable, the jaws being mobile with respect to each other in a pressure application axis, and (ii) pressure application surfaces for applying pressure to the cell housed in each support, one of the pressure application surfaces being intended to exert a pressure on an active zone of the cell when the jaws are in pressure application position;
   an actuator operatively coupled to the clamp arrangement in order to control a clamping of the jaws according to a control signal;
   a pressure sensor operatively associated to the cell in order to produce a signal indicative of a pressure exerted by the jaws on the cell;
   a cycling module for cycling the cell, the cycling module having an interface connectable to the cell for charging and discharging the cell according to a programmed cycling mode and measuring a level of charge and discharge of the cell;
   a control module for controlling the actuator, producing the control signal controlling the clamping of the jaws according to a pressure setting signal; and
   a processing unit connecting to the cycling module, to the control module of the actuator and to the pressure sensor, the processing unit being configured to program the cycling mode of the cell and transmit the cycling mode to the cycling module, to program a pressure to be applied to the cell and generate the pressure setting signal according to a pressure measured by the pressure sensor in order to form a feedback loop of the pressure applied to the cell, and to record data representative of the pressure applied to the cell and of the level of charge and discharge of the cell.

2. The system according to claim 1, wherein:
   said at least one support comprises several supports for receiving as many of said battery cells; and
   the pressure application surfaces are formed by surfaces of the jaws and surfaces of a pressure transmission plate extending between two of said supports, each pressure transmission plate being freely mobile in the pressure application axis.

3. The system according to claim 2, wherein the clamping arrangement comprises a set of guiding rods extending between the jaws in the pressure application axis, the guiding rods passing through corresponding openings in each pressure transmission plate so that each pressure transmission plate is mobile only in the pressure application axis.

4. The system according to claim 2, wherein each pressure transmission plate has an upper surface defining a positioning cavity in which a lower part of one of said supports is engageable.

5. The system according to claim 2, wherein the clamping arrangement comprises springs extending between the jaws and each pressure transmission plate so that the jaws and each pressure transmission plate are moved away from one another by a distance of at least a height of one support housing a cell when the jaws are in release position.

6. The system according to claim 1, wherein the lower jaw has an upper surface defining a cavity having a shape adapted to receive the pressure sensor so that the pressure sensor measures a pressure applied by the jaws to the cell in said at least one support.

7. The system according to claim 1, wherein the lower jaw forms a base of the clamping arrangement.

8. The system according to claim 1, wherein the upper jaw is formed by a pressure transmission plate freely mobile in the pressure application axis, and the actuator comprises a motor unit, a piston coupled to and moveable by the motor unit in the pressure application axis according to the control signal transmitted to the motor unit, and a support structure for supporting the motor unit at a fixed distance from the lower jaw, the piston having an end pressing against the pressure transmission plate forming the upper jaw when the jaws are in said pressure application position.

9. The system according to claim 1, wherein the pressure application surfaces are substantially flat and extend perpendicular to the pressure application axis.

10. The system according to claim 1, wherein the processing unit comprises a processor coupled to a memory, the memory storing instructions executable by the processor and operating parameters of the system received as input, the operating parameters comprising a test protocol used by the instructions executed by the processor and defining the pressure to be applied.

11. The system according to claim 10, wherein the test protocol defines a series of pressures to be applied and maintained during a time period, the pressure setting signal transmitted to the control module of the actuator being regulated by the processing unit in compensation to a volume variation of the cell during an execution of the cycling mode.

12. The system according to claim 11, wherein the instructions comprise instructions for dynamically varying the series of pressures to be applied and maintained as a function of cycles or a rate of charge and discharge of the cell.

13. The system according to claim 1, further comprising a temperature sensor operatively associated to the cell in order to produce a signal indicative of a temperature of the cell, the processing unit connecting to the temperature sensor and being configured to record data representative of the temperature of the cell according to the signal indicative of the temperature of the cell, the pressure setting signal being adjusted according to the temperature measured by the temperature sensor.

14. The system according to claim 1, further comprising a temperature sensor operatively associated to a cell in order to produce a signal indicative of a temperature of the cell, and a temperature adjustment module acting on a heat-exchange element flowable around the cell as a function of the signal indicative of a temperature produced by the temperature sensor and a temperature setpoint generated by the processing unit.

15. The system according to claim 1, wherein said at least one support comprises a pressure plate extending above the active zone of the cell and exceeding a contour of the housing, and the pressure application surface on the active zone defines a cavity having a shape adapted to receive a portion of the pressure plate exceeding the contour of the housing.

16. The system according to claim 15, wherein the cavity has a substantially flat bottom.

17. The system according to claim 15, wherein said at least one support further comprises:
  an insulating contact plate extending against a bottom of the housing, the contact plate having tabs projecting in openings of the contour of the housing and forming mechanical supports for terminals of the cell mounted on the contact plate in the housing which project through the openings; and
  a spacer extending above the cell, the spacer having a central portion substantially flat and matching with the active zone of the cell, and arms projecting in periphery of the central portion and pressing against the contour of the housing in order to define a positioning of the central portion on the active zone of the cell, the pressure plate extending against the central portion of the spacer, the pressure plate being in contact with the pressure application surface on the active zone of the cell of the clamping arrangement when the jaws are in the pressure application position.

18. The system according to claim 1, wherein the housing has a contour having openings through which terminals of the cell project for a connection external to the support.

19. The system according to claim 1, further comprising an elastic arrangement inserted between the pressure application surfaces in order to introduce a mechanical elasticity in the pressure application axis.

* * * * *